United States Patent
McCarthy

(10) Patent No.: US 11,617,315 B2
(45) Date of Patent: Apr. 4, 2023

(54) FLUID TREATMENT ENERGIZER

(71) Applicant: Guy McCarthy, Tucson, AZ (US)

(72) Inventor: Guy McCarthy, Tucson, AZ (US)

( * ) Notice: Subject to any disclaimer, the term of this patent is extended or adjusted under 35 U.S.C. 154(b) by 819 days.

(21) Appl. No.: 16/584,335

(22) Filed: Sep. 26, 2019

(65) Prior Publication Data

US 2020/0100443 A1  Apr. 2, 2020

Related U.S. Application Data

(60) Provisional application No. 62/737,454, filed on Sep. 27, 2018.

(51) Int. Cl.
| | | |
|---|---|---|
| *A01G 31/02* | (2006.01) | |
| *A01G 7/04* | (2006.01) | |
| *C02F 1/30* | (2023.01) | |
| *C02F 1/00* | (2023.01) | |
| *C02F 103/32* | (2006.01) | |

(52) U.S. Cl.
CPC ............ *A01G 31/02* (2013.01); *A01G 7/045* (2013.01); *C02F 1/005* (2013.01); *C02F 1/30* (2013.01); *C02F 2103/32* (2013.01)

(58) Field of Classification Search
CPC .. A01G 31/02; A01G 7/04; C02F 1/00; C02F 1/30
See application file for complete search history.

(56) References Cited

U.S. PATENT DOCUMENTS

| | | |
|---|---|---|
| 5,012,609 A | 5/1991 | Ignatius et al. |
| 5,958,104 A | 9/1999 | Nonomura et al. |
| 6,942,767 B1 * | 9/2005 | Fazzina ..................... C25B 9/19 204/263 |
| 7,422,695 B2 | 9/2008 | Foret |
| 2011/0038754 A1 * | 2/2011 | James ..................... C02F 1/325 422/243 |

* cited by examiner

*Primary Examiner* — Walter D. Griffin
*Assistant Examiner* — Cameron J Allen

(57) ABSTRACT

A green red blue (GRB) LED is used to emit electromagnetic radiation to treat water or a nutrient for plant growth enrichment. In addition to the LED, a cavity resonator is used to resonate with background electromagnetic radiation and direct the electromagnetic radiation to treat water or a nutrient for plant growth enrichment.

19 Claims, 11 Drawing Sheets

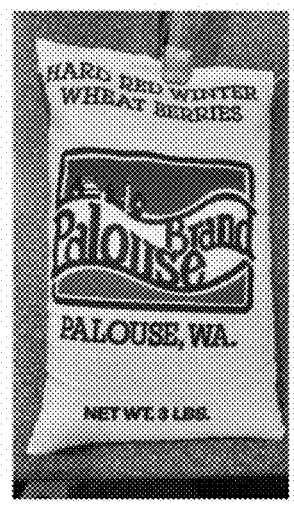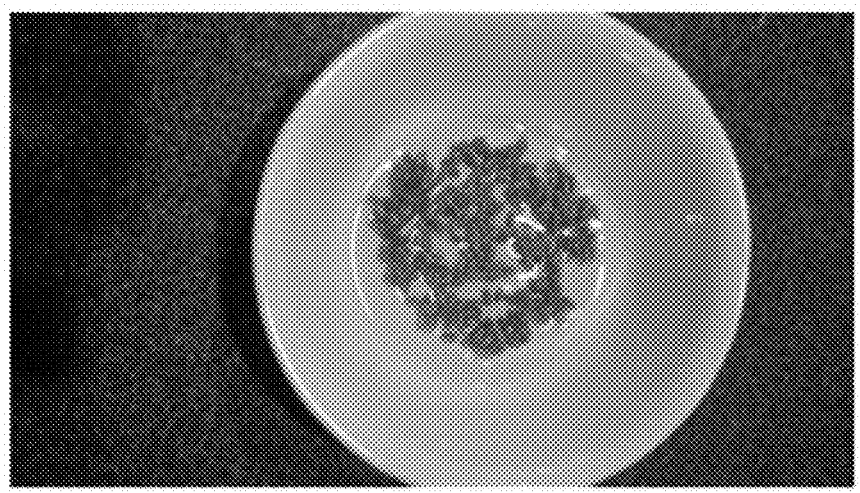
Wheat seeds were soaked in tap water for six hours.
FIG. 7A
Two jugs were filled with tap water. One jug was treated by passing the water through the Hydroponic Energizer.
FIG. 7B The wheat seeds were carefully arranged on top of glass columns. The four columns on the left were controls. The four on the right were filled with treated water.

Day 2: The first sprouts began to form.

Day 3: The seeds sprouted over treated water seemed to be growing faster than those in the control group.

Day 4: A significant difference was noted between the control group and the sprouts in treated water.

Day 5: Root development of the samples in treated water was more extensive than in the control group.

Day 6: Sprouts reached the top of the humidity dome.

Day 6: The columns were moved out of the humidity dome.

FLUID TREATMENT ENERGIZER

CROSS-REFERENCE TO RELATED APPLICATION

This application is a non-provisional application and claims benefit of U.S. Patent Application No. 62/737,454, filed Sep. 27, 2018, the specification of which is incorporated herein in their entirety by reference.

FIELD OF INVENTION

The present invention is related to a fluid treatment device. More particularly, it is related to a fluid treatment energizer to treat water or a plant nutrient for plant growth enrichment.

BACKGROUND OF THE INVENTION

The chemical formula of water, $H_2O$, is well known. The simplicity of this formula may be misleading, as different samples of water may be quite different in actual composition. In common use, water is not chemically pure dihydrogen monoxide, but rather a solution which contains trace amounts of various minerals and non-water molecules. Furthermore, different water samples may have higher or lower pH values than absolutely pure water. These trace "contaminants" may drastically change the properties of the sample. For example, while common water is a well-known electrical conductor, truly pure water is actually an electrical insulator.

As not all water is equal, water is commonly treated to add or remove minerals, filter particles, and kill microbes. Water softeners are used to treat "hard water" or water with high mineral content. Desalination systems are used to generate freshwater from saltwater. Chlorination is done to prevent algae and bacteria growth in water. Ultraviolet irradiation has been established as a method of water disinfection.

Usable water is a necessity for growing plants such as crops. Because of the large water requirements of agricultural scale growing, rainwater is often supplemented with irrigation systems which use treated or untreated groundwater. Treatment of water so as to optimize plant growth is common.

A general practice to enrich plant growth is to add chemicals. For example, Arthur M. Nonomura (U.S. Pat. No. 5,958,104) provides a method for treating plant and enriching the growth of the plant by applying an alkyl glucoside compound to the plant. The drawback of such method is environmental pollution.

LEDs have been used for plant growth enrichment. A general practice is to radiate the plant with LED radiation. For example, Ronald W. Ignatius used LED array to radiate plants. In U.S. Pat. No. 5,012,609, Ignatius disclosed a method and apparatus for irradiation of plants using optoelectronic device, such as LED. The scope of Ignatius's prior art is limited to the radiation on plant itself, not radiating the water that is used for feeding plants. LEDs have also been used for radiate sewerage to kill bacteria. The process is for sanitation, not for radiating the water that is used for feeding plants.

One major source of background electromagnetic radiation is cosmic radiation from space, such as high-energy protons and atomic nuclei. Cosmic background electromagnetic radiation also includes infrared radiation and x-ray radiation, etc. Much of this radiation may be residual from the Big Bang. Many electronic devices, such as televisions and smartphones are designed to shield such kind of radiation. There remains a need for an effective way to enhance plant growth with background electromagnetic radiation.

SUMMARY OF THE INVENTION

The present invention helps solve the environmental pollution problem associated with plant growth enrichment by using a light source such as a GRB LED to emit electromagnetic radiation to treat water or nutrient for feeding the plant. In addition to LED method, the present invention also uses a cavity resonator or cavity antenna to resonate with background electromagnetic radiation to treat water and/or nutrients for plant growth enrichment.

The present invention uses a combination of GRB LEDs and a cavity resonator. The GRB emits electromagnetic radiation to the fluid and the cavity resonator captures the ambient background electromagnetic radiation and directs the electromagnetic radiation to the fluid. Without wishing to limit the present invention to any particular theory or mechanism, it is believed that the electromagnetic radiation is directed via radiant emission from a metal coating of the cavity resonator.

The two components of the system (the LED and the cavity resonator) work independently but also have a synergistic effect. Without wishing to limit the present invention to any particular theory or mechanism, the synergy may be explained as follows: as a consequence of resonance with background radiation, the dielectric material becomes energized and some of that energy is transferred to the reflective metal coating. This results in an energetic emission from the outer metal surface. This same metal surface is also reflecting light from the LED. The energetic emission originating from the dielectric material is conditioned or modulated by the wavelengths (aka, frequency profile) of LED light. Conversely, the photons of reflected light are conditioned or modulated by the energetic emission from the dielectric material. The key point is that molecules on the surface of the metal coating are exposed to both forms of energetic stimulation, and this exposure has a qualitative effect on both forms of energetic output. In addition to receiving the background radiation, the resonator also amplifies it and translates it into a form that is compatible with biofield energy. Therefore, it has greater functionality than just an antenna.

Without wishing to limit the present invention to any particular theory or mechanism, it is believed that the cavity antenna resonates with electromagnetic background radiation in the GHz (aka, microwave) frequency range. Such radiation reaches the Earth from all directions and is also known as the Cosmic Microwave Background (CMB). The antenna creates a standing wave of electromagnetic energy whose fundamental frequency is related to the size and shape of the antenna. In addition to resonance at the fundamental frequency, the antenna also creates a complex series of harmonics. The distribution of harmonic frequencies (aka, the frequency spectrum envelope) will vary based on materials and configuration of the cavity antenna. This distribution is analogous to the notion of acoustical timbre, in which the same fundamental tone produces a unique sound when played on different musical instruments.

One key point is that biological effects may result from the distribution of harmonic frequencies, which is analogous to the notion of acoustical timbre. This "timbre" is believed to be captured in the physical structure of the flowing fluid, by causing large molecular groups or "clusters" to break apart and re-combine into shapes and sizes more compatible with biological activity. The distribution of harmonic frequencies or "timbre" of the radiation may be more important than the fundamental frequency. While it may be possible to derive the necessary frequency distribution through experimentation and to reproduce that distribution using other methods, such a device would necessarily be highly specialized and expensive to produce. The method of the present invention is much simpler and refined. Therefore, it has the potential to be deployed to a much greater extent and at lower cost than a competing solution based on alternate methods for generating electromagnetic radiation.

Energetic emissions from cavity antennas are of extremely low magnitude and may not register on conventional meters or electronic equipment. However, a biological effect has been seen in testing with human subjects and plants. In most design variants the energetic emission is transferred via direct radiation from an emissive surface. The energetic emission from the devices of the present invention can be focused in any direction with a suitable selection of materials and configuration. In some variants the energetic emission is captured in a receiving chamber and transferred via a shielded conductor to a variety of peripheral devices.

Biological systems react to the energetic emission and the distribution of harmonic frequencies created by the design. The biological reaction may produce desired conditions in plants such as improved nutrient uptake and increased water retention, conditions which may result in increased yields and/or reduced cost of inputs in crop production. Design variants may be applicable for the treatment of water and nutrient solutions used in agriculture, and for direct irradiation of seeds and growing plants.

The feature of using LED to emit electromagnetic radiation to treat fluid is critical because it points out a new way to treat fluid for plant growth enrichment. The method and associated device are not mentioned in prior arts.

Also, the feature of using LED together with a cavity resonator to resonate with background electromagnetic radiation and direct the background electromagnetic radiation to treat fluid is critical because it provides for a resonant radiation that could effectively grow plants. The method and associated device are not mentioned in prior arts.

Neither of the below cited works can achieve the critical function of the feature in the presently claimed invention.

Foret (U.S. Pat. No. 7,422,695 B2) pointed out a method and apparatus for treating liquids flowing in a thin film around a source of wave energy to directly expose the liquid to the wave energy, which is preferably generated in whole or part by an electrical arc between carbon electrodes. In addition to the wave energy generated by the electric arc, energy generated by cavitation of the flowing liquid may be used in treating the liquid. Forest did not teach using GRB LED as an electromagnetic radiation to treat fluid. Furthermore, Forest did not mention using a cavity resonator to resonate with background electromagnetic radiation and direct the background magnetic radiation to treat fluid.

Ignatius (U.S. Pat. No. 5,012,609) proposed a method and an apparatus for irradiation of plants using optoelectronic device that emit radiant energy at appropriate wavelength. The device consists of an array of light emitting diodes (LED). Ignatius did not teach using GRB LED as an electromagnetic radiation to treat fluid to feed plant. Furthermore, Ignatius did not mention using a cavity resonator to resonate with background electromagnetic radiation and direct the background magnetic radiation to treat fluid.

BRIEF DESCRIPTION OF THE DRAWINGS

The features and advantages of the present invention will become apparent from a consideration of following detailed description presented in connection with the accompanying drawings in which:

FIGS. 7A-7I show photographs illustrating the application of a fluid treatment energizer of the present invention in wheat seed germination.

DETAILED DESCRIPTION OF THE INVENTION

Figure 1:
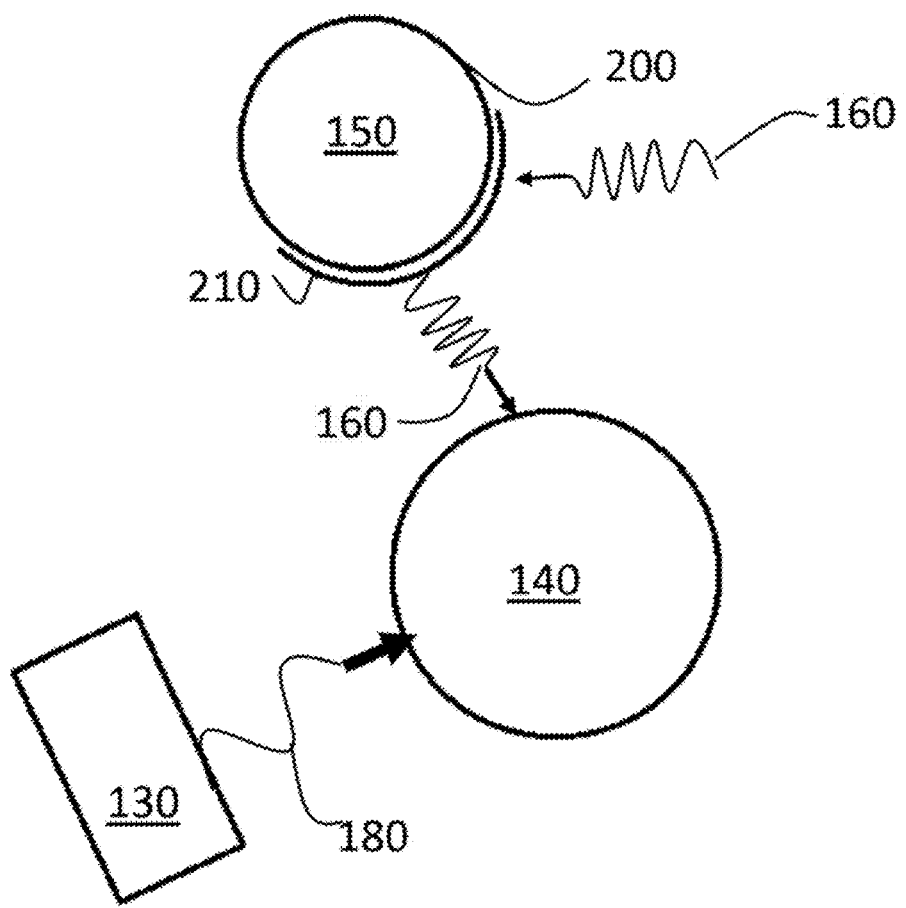
FIG. 1 is a schematic drawing of present invention, showing how radiations (160), (180) from LED (130) and cavity resonator (150) have been used to treat fluid (140).

Following is a list of elements corresponding to a particular element referred to herein:
100 Fluid treatment energizer
110 Housing
120 Transparent tube
122 Container
124 Inlet
126 Outlet
130 LED
140 Fluid
150 Cavity resonator
160 Background electromagnetic radiation
170 Axis
180 Electromagnetic radiation
200 Dielectric tube
210 Reflective coating In a broad embodiment, the present invention relates to fluid treatment. It may feature a device (100) called fluid treatment energizer. The device (100) may comprise a solid housing structure (110), a transparent tube (120), a strip of green red blue light emitting diode GRB LED (130) and a cavity resonator (150) or a cavity antenna. In some embodiments another light source could be used in place of the GRB LED (130). As non-limiting examples, a single color LED or a different combination of colored LEDs could be used. Preferably, the light source would be programmable such that a specific frequency profile could be generated.

The optimal frequency/wavelength distribution of light for various crops is a topic that is currently being studied in the field of controlled environment agriculture (i.e., for greenhouses). While mainstream agricultural research is focused on optimizing light frequency profiles for increased vegetative growth and crop yields, it is frequently overlooked that plant organs responsive to light are also infused with water or water-based fluid. Without wishing to limit the present invention to any particular theory or mechanism, it is believed that the molecular response of water or a water-based fluid to a programmed light source is integral to the response of the plant as evidenced by increased vegetative growth.

The housing (120) may serve to support the components of the device (100) and to hold them in a desired configuration. The components may be inflexibly attached to the housing or alternatively attached in such a way as to allow for adjustability of the configuration. The housing may be freestanding so as to allow for easy portability of the entire system. In some embodiments, the housing may form a protective shield to protect the inner components from harm and damage. In other embodiments, the housing may be opaque so as to block undesirable external light from the interior of the device.

The shape of the housing can be circular, square, rectangular, triangular or irregular in shape. The housing structure (110) may be made of solid boards or plates. Non-limiting example of solid boards or plates includes wood, metal and plastic. The shape may have corners or rounded edges. The size of the boards or plates ranges from 0.5 square feet to 10 square feet, e.g. 0.5 square feet to 2 square feet, 2 square feet to 4 square feet, 4 square feet to 6 square feet, 6 square feet to 8 square feet, 8 square feet to 10 square feet. For example, 1 square foot. The thickness of the boards or plates ranges from 0.25 inches to 1 inch, e.g. 0.25 inches to 0.5 inches, 0.5 inches to 0.75 inches, 0.75 inches to 1 inch. For example, 0.5 inches. Alternatively, the components of the device may be supported by structures other than a housing. As a non-limiting example, the components of the device may be suspended from a support by wires.

In a preferred embodiment, the transparent tube (120) is configured to contain a fluid (140) to be treated by the device (100). One advantage to containing the fluid (140) in a tube as compared to another shape container is that a tube has very high surface area. Furthermore, if the tube is a coiled tube, the surface area may be maximized while keeping the overall size of the device small. The large surface area provided by the tube may have the advantage of allowing for good thermal transfer between the fluid and the surrounding environment. Additionally, the large surface area may allow for more efficient irradiation of the fluid (140) by reducing the possibility for self-shielding of the inner portions of the fluid (140) by the outer portions of the fluid (140).

The transparent tube (120) may be totally or partially transparent. For example, the tube may be transparent to selected wavelengths of light while being opaque to other undesired wavelengths of light. Alternatively, certain portions of the tube may be transparent while other portions are totally or partially opaque.

The shape of the transparent tube (120) may be straight, curved, or helicoid. In some embodiments, an inlet of the transparent tube may comprise a nozzle configured to induce rotation of a fluid which passes through the nozzle. This fluid rotation may induce mixing of the fluid. The transparent tube (120) may have an inner diameter ranging from 0.05 inches to 0.5 inches, e.g. 0.05 to 0.1 inches, 0.1 inches to 0.25 inches, 0.25 inches to 0.5 inches, for example 0.1 inches.

The outer diameter of the transparent tube (120) has an range from 0.1 inches to 1 inch, e.g. 0.1 inches to 0.25 inches, 0.25 inches to 0.5 inches, 0.5 inches to 0.75 inches, 0.75 inches to 1 inch. For example, 0.5 inches. The length of the transparent tube (120) ranges from 1 foot to 10 feet, e.g. 1 foot to 5 feet, 5 feet to 10 feet. For example, 2 feet. The non-limiting example of transparent tube includes glass tube and plastic tube. The tube may be rigid or flexible. In some embodiments, the tube may be designed to be easily replaceable in the event of degradation or breakage. The tube may comprise a single continuous member or a plurality of connected segments.

The LED strip (130) has a density ranging from 1 LED chip per inch to 100 LED chips per inch, e.g. 1 to 30 LED chips per inch, 30 to 70 LED chips per inch, 70 to 100 LED chips per inch, for example 30 LED chips per inch. Each LED chip has a power ranging from 1 mw to 500 mw, e.g. 1 mw to 100 mw, 100 mw to 250 mw, 250 mw to 500 mw, for example 100 mw.

The cavity resonator (150) may be made of dielectric material with reflective metal coating, for example chrome. Non-limiting examples of dielectric material include PVC, mica, plastics, glass, porcelain, or a non-conductive composite material such as fiberglass. In some preferred embodiments, the dielectric material may be one which can be fabricated into a smooth cavity shape. In one embodiment, the cavity resonator (150) may comprise a plastic tubing. The length of the cavity resonator (150) ranges from 6 inches to 5 feet, e.g. 6 inches to 2 feet, 2 feet to 5 feet, for example 1 foot. The inner diameter ranges from 0.1 inches to 0.5 inches, e.g. 0.1 inches to 0.25 inches, 0.25 inches to 0.5 inches, for example 0.25 inches. The outer diameter ranges from 0.2 inches to 1 inch, e.g. 0.2 inches to 0.5 inches, 0.5 inches to 1 inch, for example, 0.5 inches. The cavity resonator (150) resonance frequency may be between $3 \times 10^8$ Hz to $3 \times 10^{11}$ Hz, e.g. $3 \times 10^8$ Hz to $3 \times 10^9$ Hz, $3 \times 10^9$ Hz to $3 \times 10^{10}$ Hz, $3 \times 10^{10}$ Hz to $3 \times 10^{11}$ Hz, For example, $3 \times 10^9$ Hz. The cavity resonator (150) may be made of dielectric material with partial continuous reflective metal coating along the longitudinal direction.

In one embodiment, an interior of the cavity resonator (150) may be filled with ambient air. In other embodiments, the interior may comprise a vacuum chamber or may be filled with a gas or a mixture of gasses. Non-limiting examples of gasses which may be used to fill the interior of the cavity resonator include nitrogen, oxygen, helium, neon, argon, krypton, xenon, or another gas or mixture of gasses. The interior of the cavity resonator (150) may have a higher or a lower pressure than atmospheric pressure. As non-limiting examples, the interior of the cavity resonator (150) may have a pressure of about 0.000001, 0.00001, 0.0001, 0.001, 0.01, 0.1, 0.5, 1, 1.1, 1.2, 1.3, 1.4, 1.5, 2, 5, 10, 50, 100, 500, or 1000 atm. In some embodiments, the reflective metal coating (210) of the cavity resonator (150) may be continuous along the longitudinal direction and the longitudinal length of the reflective coating (210) is the same as that of the tube (200).

In some embodiments, the reflective metal coating (210) may be a thin layer so as to allow for maximum conduction of energy from the dielectric material to the metallic emissive surface. As non-limiting examples, the reflective metal coating (210) may be a metal foil or a metallized film comprising copper, brass, chromium, gold, or another metal. Without wishing to limit the present invention to any particular theory or mechanism, it is believed that the selection of metal is significant as markedly different biological responses have been observed from devices constructed with copper and chromium.

In some embodiments, the reflective metal coating (210) may form a pattern which alternates between coated and uncoated segments along a length or a circumference of the cavity resonator (150). Without wishing to limit the present invention to any particular theory or mechanism, it is believed that the uncoated segments of the tube absorb or allow transmission of electromagnetic energy while the coated segments of the tube emit biofield energy. In some embodiments, the ratio of the coated arc length to the uncoated arc length varies, e.g. 1:3, 1:1, 3:1, for example it can be a golden ratio of 1.61 to 1.

In some embodiments, the cavity resonator (150) may be made of dielectric material with partial continuous reflective metal coating along the longitudinal direction. The ratio of the uncoated arc length to the coated arc length varies, e.g. 1:3, 1:1, 3:1, for example it can be a golden ratio of 1.61 to 1.

In some embodiments, the cavity resonator (150) may be made of dielectric material with partial continuous reflective metal coating along the longitudinal direction. The ratio of the coated arc length to the uncoated arc length varies, e.g. follow Fibonacci number of 1,1,2,3,5,8:1 for example it can be 5:8. As natural biological systems related to growth and propagation exhibit the Fibonacci ratio and the present invention focuses on a biological response, this ratio may be preferable and allow for easy shaping and direction of the output field.

In some embodiments, the cavity resonator (150) may be made of dielectric material with partial continuous reflective metal coating along the longitudinal direction. The ratio of the uncoated arc length to the coated arc length varies, e.g. follow Fibonacci number of 1,1,2,3,5,8:1 for example it can be 5:8.

In some embodiments, the reflective metal coating (210) of the cavity resonator (150) may be discrete. The ratio of the longitudinal length of reflective metal coating section (210) to uncoated section follows Fibonacci numbers of 1, 1, 2, 3, 5, 8, 13, 21, 34, 55, 89, 144:1. The coated section and uncoated section are arranged alternatively until the full length of the tube (200) is exhausted, for example, if C stands for coated section, U stands for uncoated section. 1C stands for 1unit length of coated section, then 1U stands for 1unit length of uncoated section. One embodiment of cavity resonator (150) may follow the pattern 1C1U1C1U2C1U3C1U5C1U8C. Other configurations may follow other patterns such as 1C1U1C1U2C1U3C; 1C1U1C1U2C1U3C1U8C1U13C and so on.

In some embodiments, the transparent tube (120) may be a helicoid and the LED strip (130) may be on or adjacent to the axis (170) of the helicoid. The transparent tube (120) and the LED (130) may be adjacent to each other. A set of cavity resonators (150) may be disposed around and adjacent to outer surface of the helicoid transparent tube (120). The two ends of transparent tube (120), LED strip (130) and the cavity resonators (150) may be mounted on the housing (110) boards or plates. In one embodiment, a spacing between the transparent tube (120) and the LED strip (130) or the cavity resonator (150) may provide for air cooling of the transparent tube (120).

In some embodiments, a set of straight transparent tubes (120) may be disposed around the LED strip (130). The transparent tubes (120) and the LED strip (130) may be adjacent to each other. A set of cavity resonators (150) may be disposed around the set of transparent tubes (120). The two ends of transparent tubes (120), LED strip (130) and the cavity resonators (150) may be mounted on the housing (110) boards or plates.

In some embodiments, the LED strips (130) and the cavity resonators (150) may be disposed alternatively around and adjacent to the transparent tube which can be straight or helicoid. The LED strips (130) the cavity resonators (150) and the transparent tube (120) may be adjacent to each other. The two ends of transparent tube (120), LED strips (130) and cavity resonators (150) may be mounted on the housing (110) boards or plates.

In some embodiments, the fluid may be water or nutrient of a plant. As a non-limiting example, the fluid may contain nutrients and minerals such as nitrogen, phosphorus, potassium, silica, etc. In some embodiments the flow rate of fluid may be in the range of 5 mL per minute to 100 mL per minute, e.g. 5 mL/min to 10 mL/min, 10 mL/min to 25 mL/min, 25 mL/min to 50 mL/min, 50 mL/min to 100 mL/min, for example, 50 mL per minute. In one embodiment, the treated fluid passes through the device a single time. In an alternative embodiment, the treated fluid is recycled through the device two or more times. In one embodiment the fluid exhibits laminar flow with a rotational component and passes through the device more than once. As a non-limiting example, the fluid may be pumped continuously through the device for about 1, 2, 3, 4, 5, 10, 15, 20, 25, 30, 35, 40, 50, 60, 75, 90, 120, or greater than 120 minutes.

In one embodiment, the present invention features method of treating water for irrigation of plants. As a non-limiting example, the method may comprise: providing a fluid (140) to be treated; providing a fluid treatment energizer device (100), the device (100) comprising: a transparent tube (120) for a fluid (140) to pass through; a strip of green red blue (GRB) light emitting diodes (LED) (130) configured to irradiate the fluid (140) inside of the transparent tube (120); and a cavity resonator (150) configured to resonate with a background electromagnetic radiation (160) and direct the background electromagnetic radiation (160) to the fluid (140) inside of the transparent tube (120); and passing the fluid (140) through the fluid treatment device (100) while irradiating the fluid (140) via the LEDs (130) and the cavity resonator (150).

In some embodiments, the LEDs (130) and the cavity resonator (150) may provide different wavelengths of electromagnetic radiation. In some embodiments, the treated fluid (140) may be cycled through the device (100) two or more times. In some embodiments, untreated fluid (140) may be continuously introduced into the device (100). In some embodiments, the fluid (140) may be prefiltered before treatment.

In some embodiments, the fluid treatment energizer may be used in seed germination. As a non-limiting example, the fluid treatment energizer may promote seed germination or growth of plant species such as wheat, rice, barley, oats, beans, and corn, vegetables such as tomatoes, peppers, and lettuce, as well as culinary herbs such as basil, sage, and rosemary. In other non-limiting examples, the fluid treatment energizer may be used to treat water or nutrients for human or animal consumption.

Figure 2A:
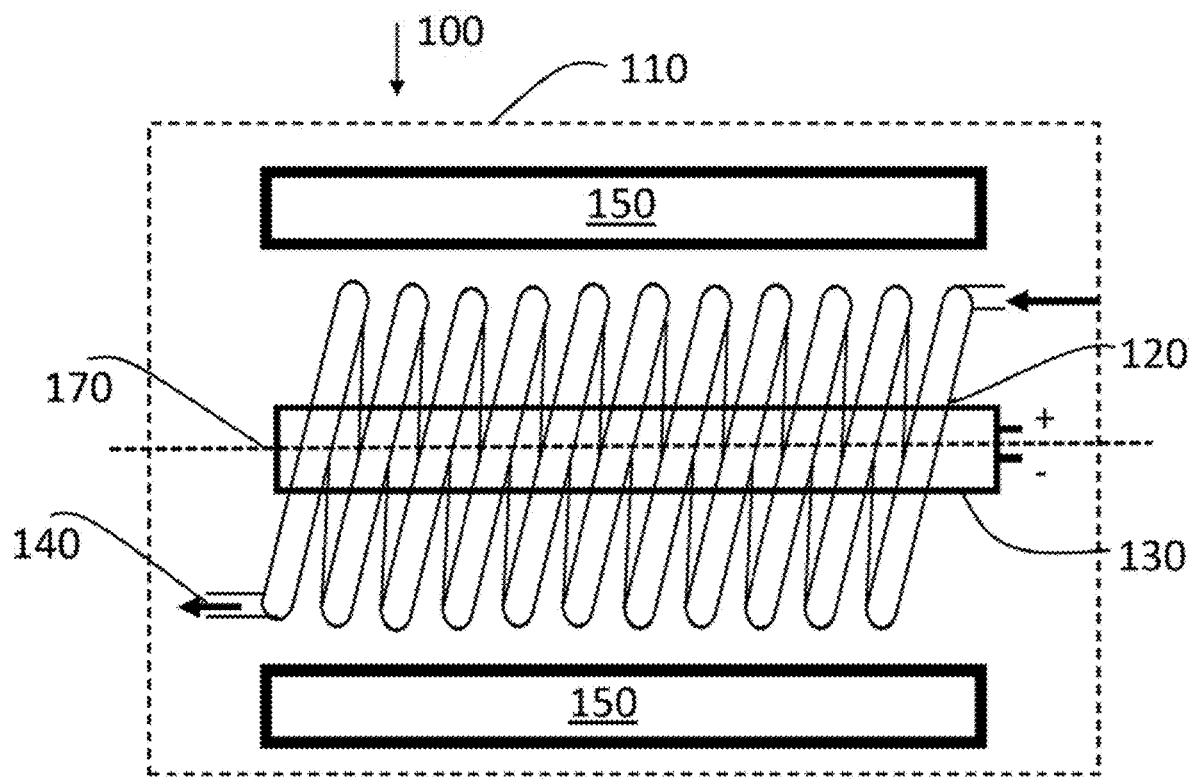
FIGS. 2A-2B are schematic drawings of present invention, showing an embodiment in which the transparent tube (120) is a helicoid, the LED strip (130) is on an axis of the helicoid and the cavity resonator (150) is around an outer surface of the tube (120).
Figure 2B:
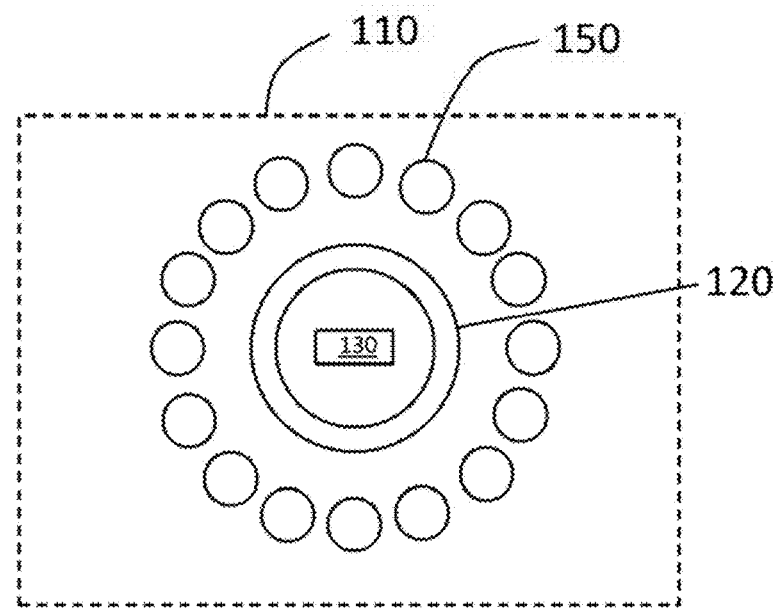
Figure 3A:
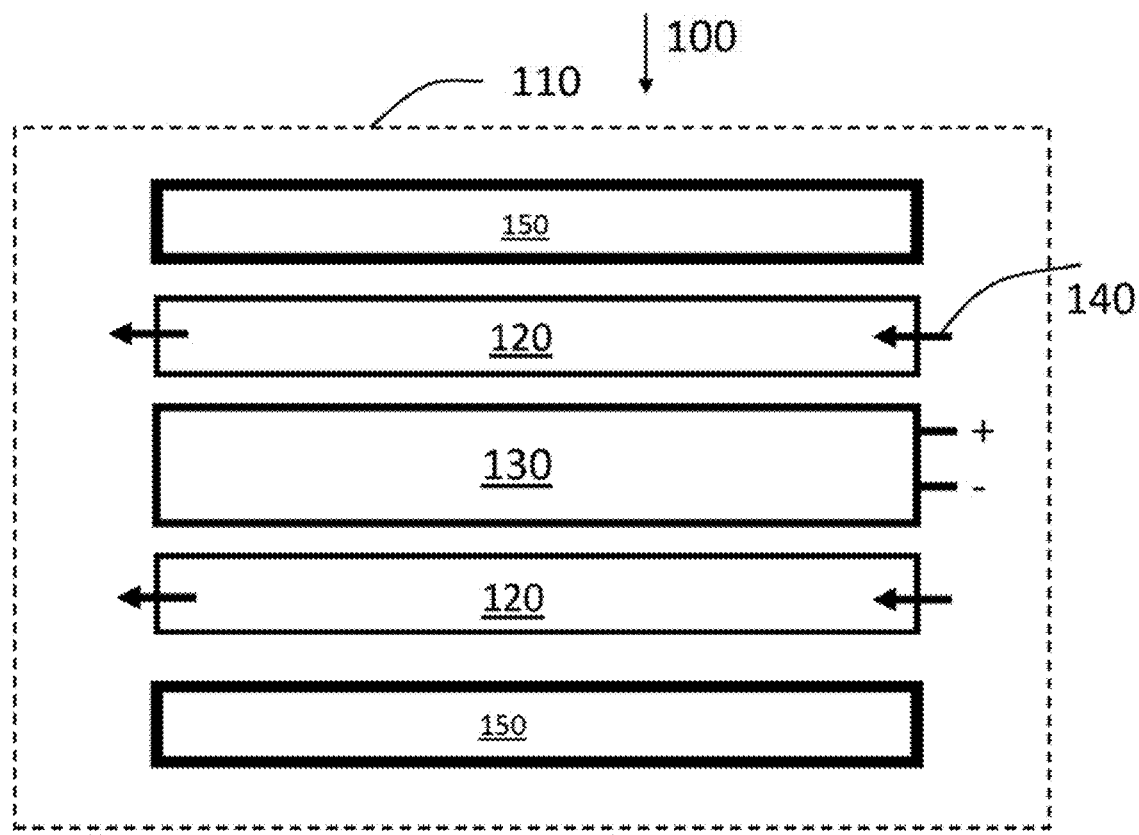
FIGS. 3A-3B are schematic drawings of present invention, showing an embodiment in which a set of straight transparent tubes (120) are disposed around the LED strip (130) and the cavity resonators (150) are disposed around the set of tubes (120).
Figure 3B:
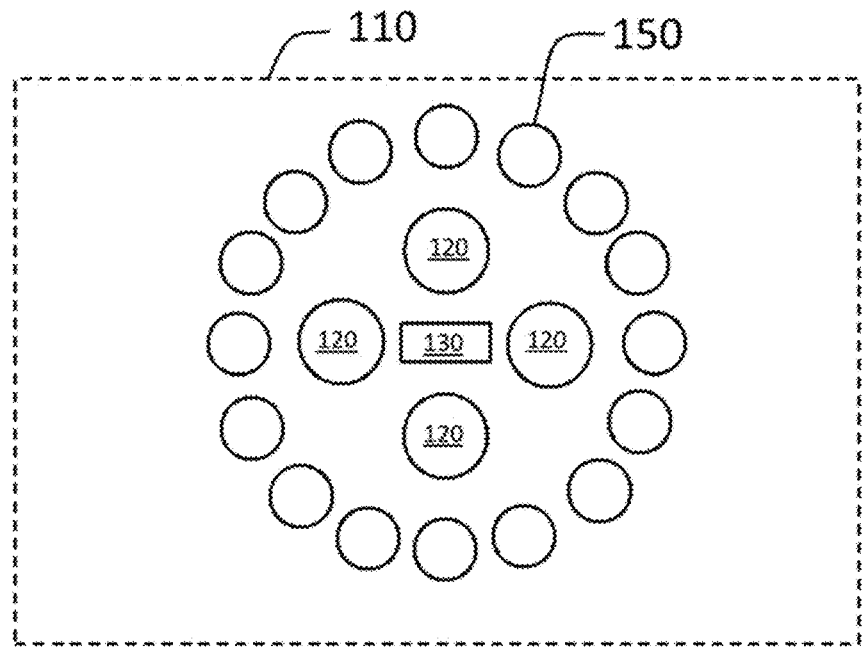
Figure 4A:
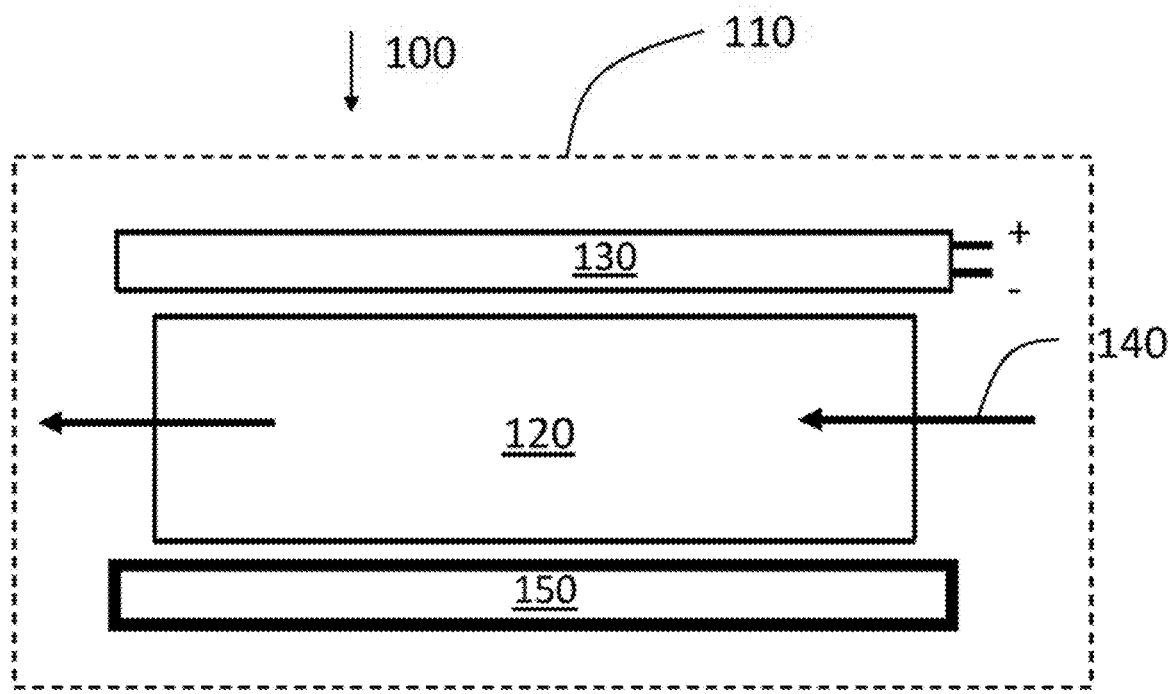
FIGS. 4A-4B are schematic drawings of present invention, showing an embodiment in which the LED (130) and the cavity resonator (150) are alternatively disposed around a transparent tube (120). The tube can be straight or helicoid.
Figure 4B:
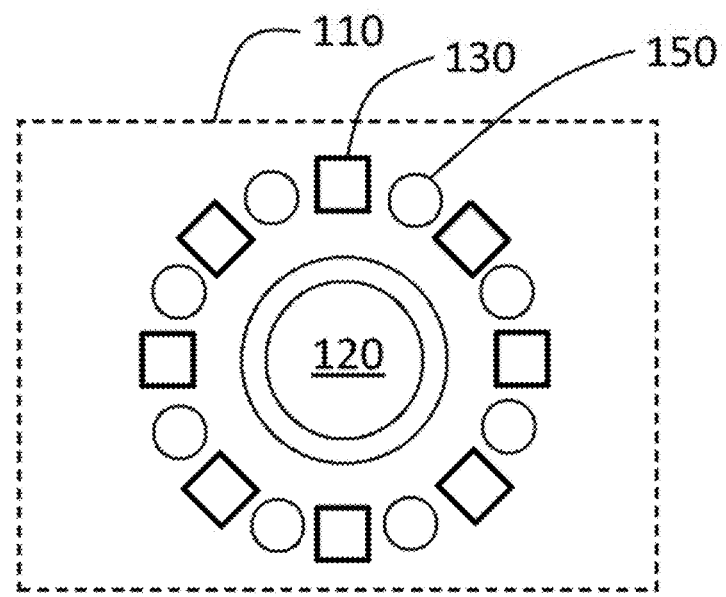
Figure 5A:
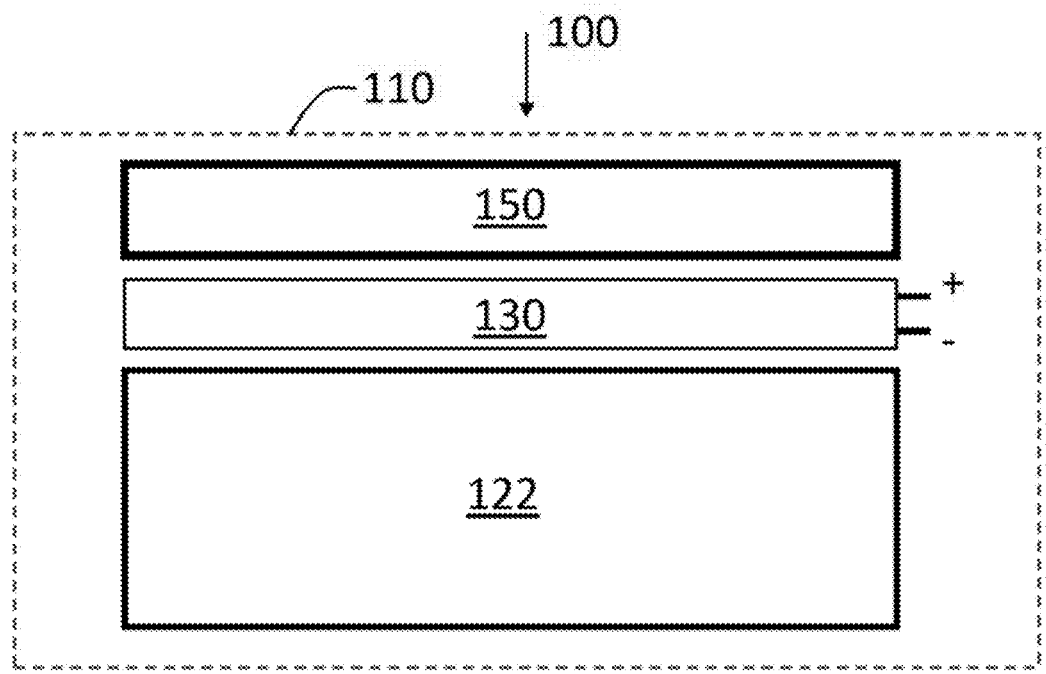
FIGS. 5A-5B are schematic drawings of present invention, showing an embodiment in which the LED (130) and the cavity resonator (150) are alternatively disposed slightly above a container (122).
Figure 5B:
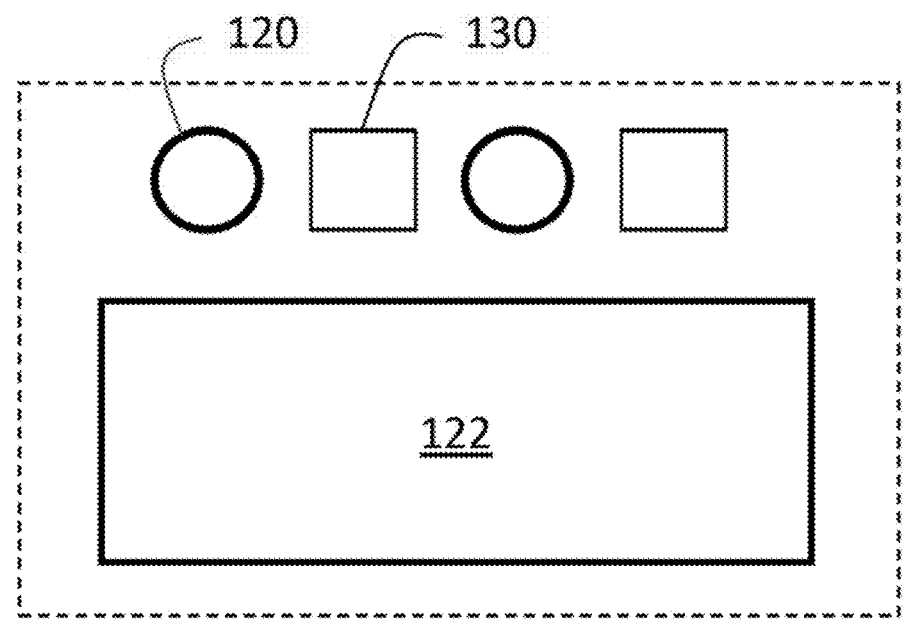
Figure 6A:
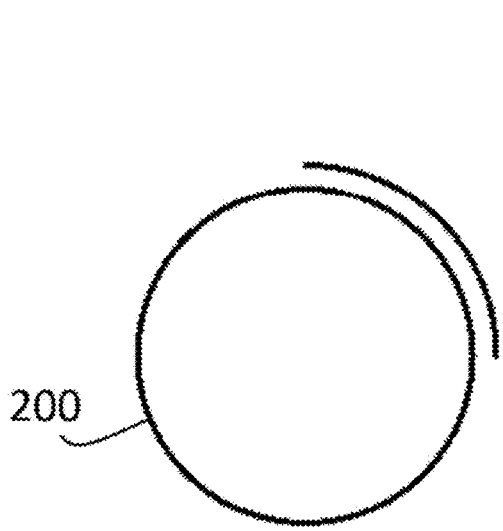
FIGS. 6A-6D are schematic drawings of present invention, showing embodiments in which the cavity resonators (150) have different ratios of reflective metal coated area (210) to uncoated area (200).
Figure 6B:
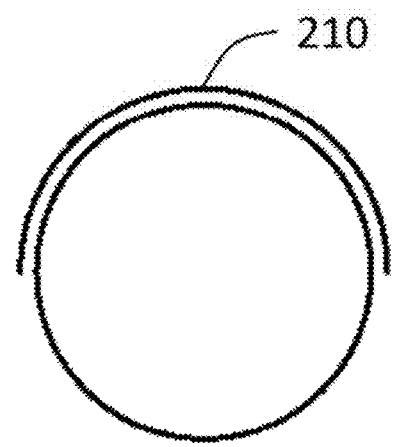
Figure 6C:
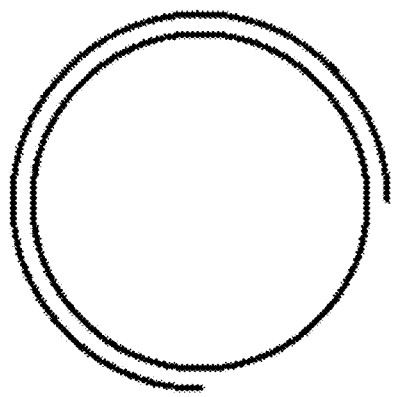
Figure 6D:
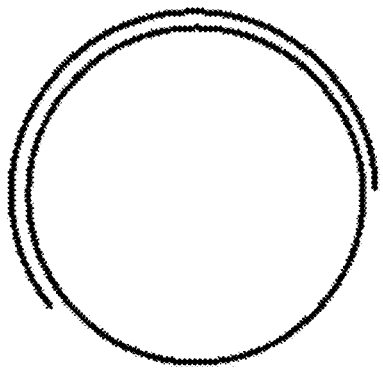
Figure 6E:
FIG. 6E-6F show a continuous coating (6E) and one corresponding to the discrete Fibonacci numbers (6F).
Figure 6F:
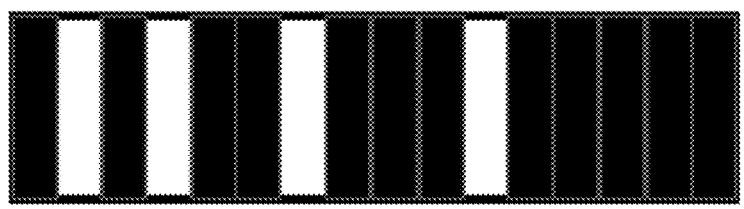
Figure 7C:
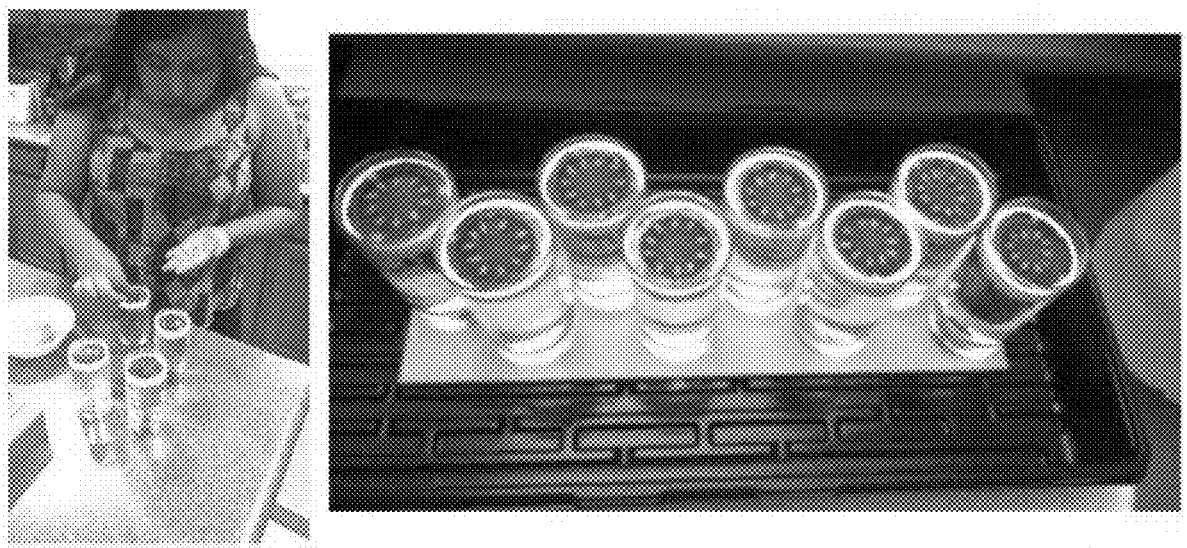
Figure 7D:
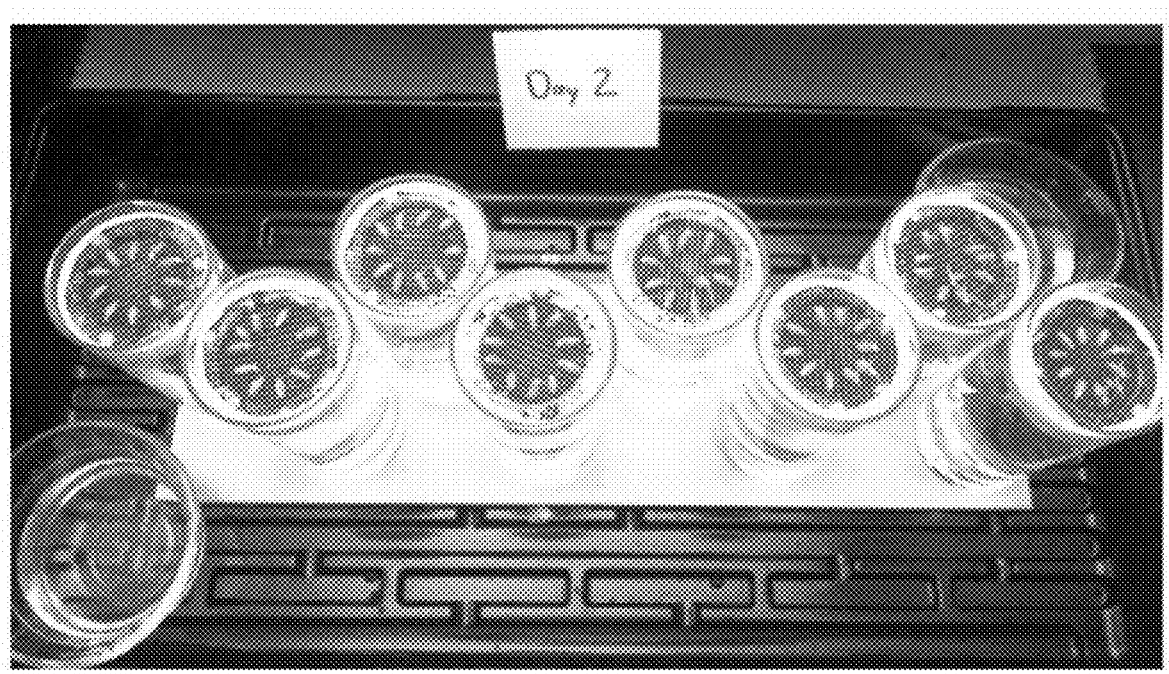
Figure 7E:
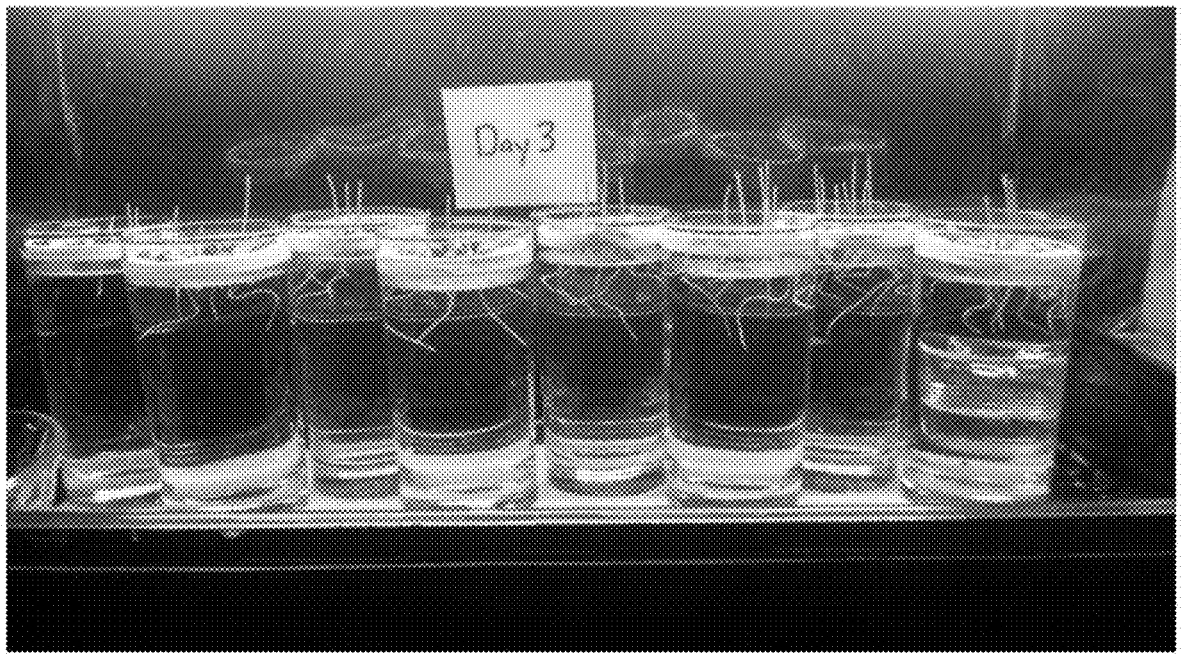
Figure 7F:
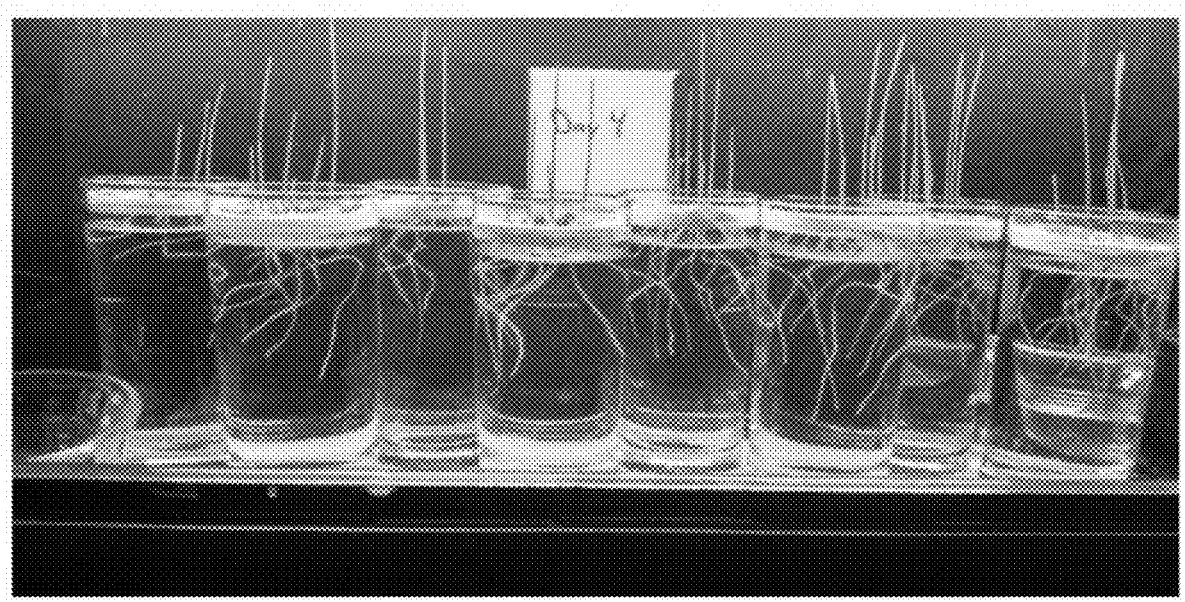
Figure 7G:
Figure 7H:
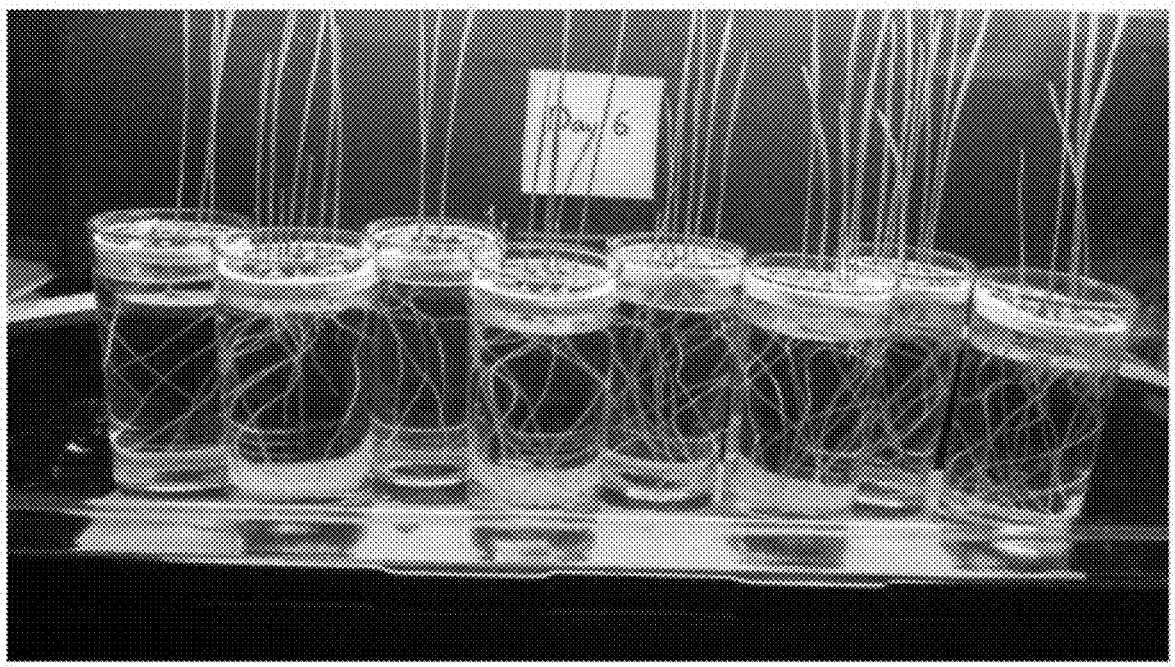
Figure 71:
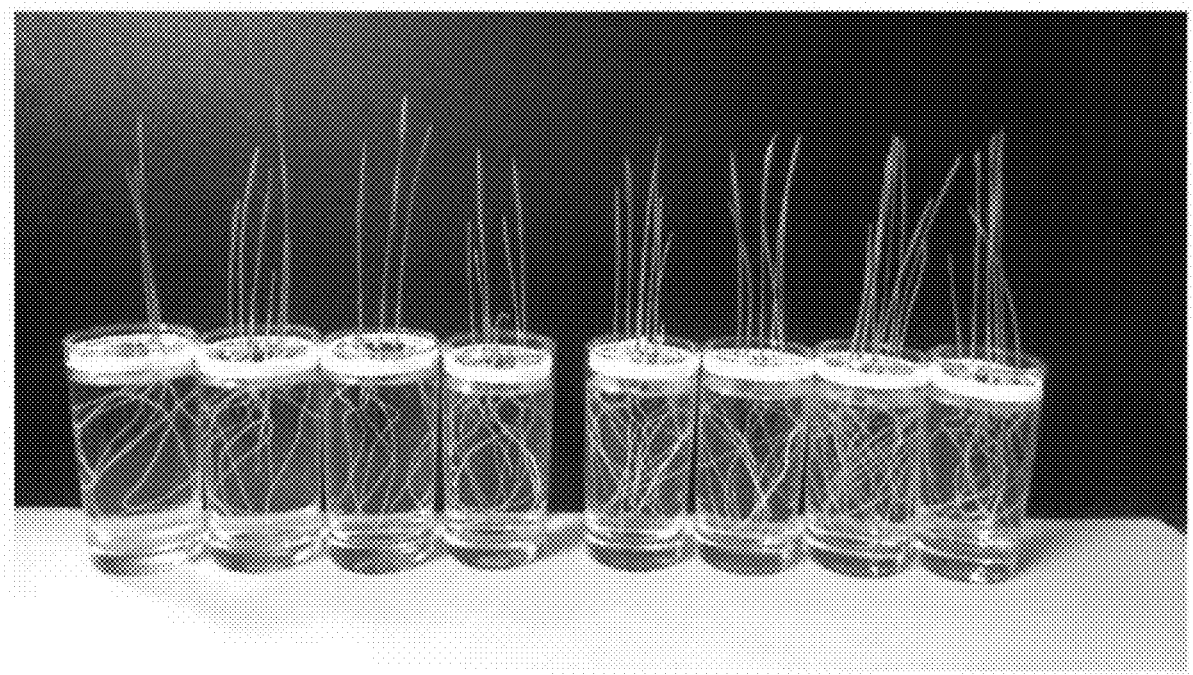

As a non-limiting example, wheat seeds were soaked in tap water for 6 hours, then placed on top of glass columns to germinate. Four columns were filled with tap water, and four were filled with water treated by fluid treatment energizer shown in FIGS. 2A-2B and FIG. 7B. Treated water passed through the fluid treatment energizer once at the flow rate of 50 mL per minute. A turkey baster was used as pump.

Growth was monitored for 6 days. FIG. 7A-7I show that water treated by fluid treatment energizer enriches the plant growth.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A fluid treatment energizer device (100) comprising:
   a) a device housing (110);
   b) a transparent tube (120) disposed in the housing (110), the transparent tube (120) having an inlet (124) and an outlet (126) such that a fluid (140) may be passed through the transparent tube (120);
   c) a strip of green red blue (GRB) light emitting diodes (LED) (130) disposed adjacent the transparent tube (120); and
   d) a cavity resonator (150) disposed adjacent to the transparent tube, wherein the cavity resonator (150) comprising:
      i. a dielectric tube (200); and
      ii. a reflective coating (210) applied to a side of the dielectric tube (200) along a longitude of the dielectric tube (200) facing the transparent tube (120);
   wherein the cavity resonator (150) is configured to resonate with a background electromagnetic radiation (160) and direct the background electromagnetic radiation (160) from the reflective coating (210) to the fluid (140), and
   wherein the LED (130) is configured to emit an electromagnetic radiation (180) toward the fluid (140).

2. The device of claim 1, wherein the inlet (124) comprises a nozzle configured to induce rotation of the fluid (140) as it is passed through the transparent tube (120).

3. The device of claim 1, wherein the cavity resonator (150) is a tube made of dielectric material partially coated with reflective metal along a longitudinal direction of the tube and having a resonance frequency of at least 1 GHz.

4. The device of claim 1, wherein a fluid flow rate is at least 1 ml per minute range.

5. The device of claim 1, wherein the two ends of the transparent tube (120) and the LED strip (130) are mounted on the solid housing (110).

6. The device of claim 1, wherein the intensity and the frequency of electromagnetic radiation of the LED strip (130) is adjustable.

7. The device of claim 1, wherein the device (100) comprises air gaps between the transparent tube (120), the LED (130), and the cavity resonator (150).

8. A cavity resonator (150) comprising:
   a) a dielectric tube (200); and
   b) a reflective coating (210) applied to an outside surface of the tube (200) along a longitude of the dielectric tube (200);
   wherein the cavity resonator (150) is configured to resonate with background electromagnetic radiation (160) and direct the background electromagnetic radiation (160) from the reflective coating.

9. The cavity resonator (150) of claim 8, wherein a ratio of reflective metal coating area to uncoated area is selected so as to correspond with a frequency of background electromagnetic radiation (160).

10. The cavity resonator (150) of claim 8, wherein the background electromagnetic radiation (160) is directed via a coated and an uncoated portion of the dielectric tube.

11. The cavity resonator (150) of claim 8, wherein the dielectric tube (200) is a sealed tube.

12. The cavity resonator (150) of claim 8, wherein the reflective coating comprises a metal film.

13. The cavity resonator (150) of claim 8, wherein the dielectric tube (200) comprises a straight cylindrical shape.

14. A method of treating water for irrigation of plants, the method comprising:
   a) providing a fluid (140) to be treated;
   b) providing a fluid treatment energizer device (100), the device (100) comprising:
      i. a transparent tube (120) for a fluid (140) to pass through;
      ii. a strip of green red blue (GRB) light emitting diodes (LED) (130) configured to irradiate the fluid (140) inside of the transparent tube (120); and
      iii. a cavity resonator (150) configured to resonate with a background electromagnetic radiation (160) and direct the background electromagnetic radiation (160) to the fluid (140) inside of the transparent tube (120); and
   c) passing the fluid (140) through the fluid treatment device (100) while irradiating the fluid (140) via the LEDs (130) and the cavity resonator (150).

15. The method of claim 14, wherein the fluid (140) is treated for about 10-30 minutes.

16. The method of claim 14, wherein the LEDs (130) and the cavity resonator (150) provide different wavelengths of electromagnetic radiation.

17. The method of claim 14, wherein the treated fluid (140) is cycled through the device (100) two or more times.

18. The method of claim 14, wherein untreated fluid (140) is continuously introduced into the device (100).

19. The method of claim 14, wherein the fluid (140) is prefiltered before treatment.

* * * * *